Figure 1:
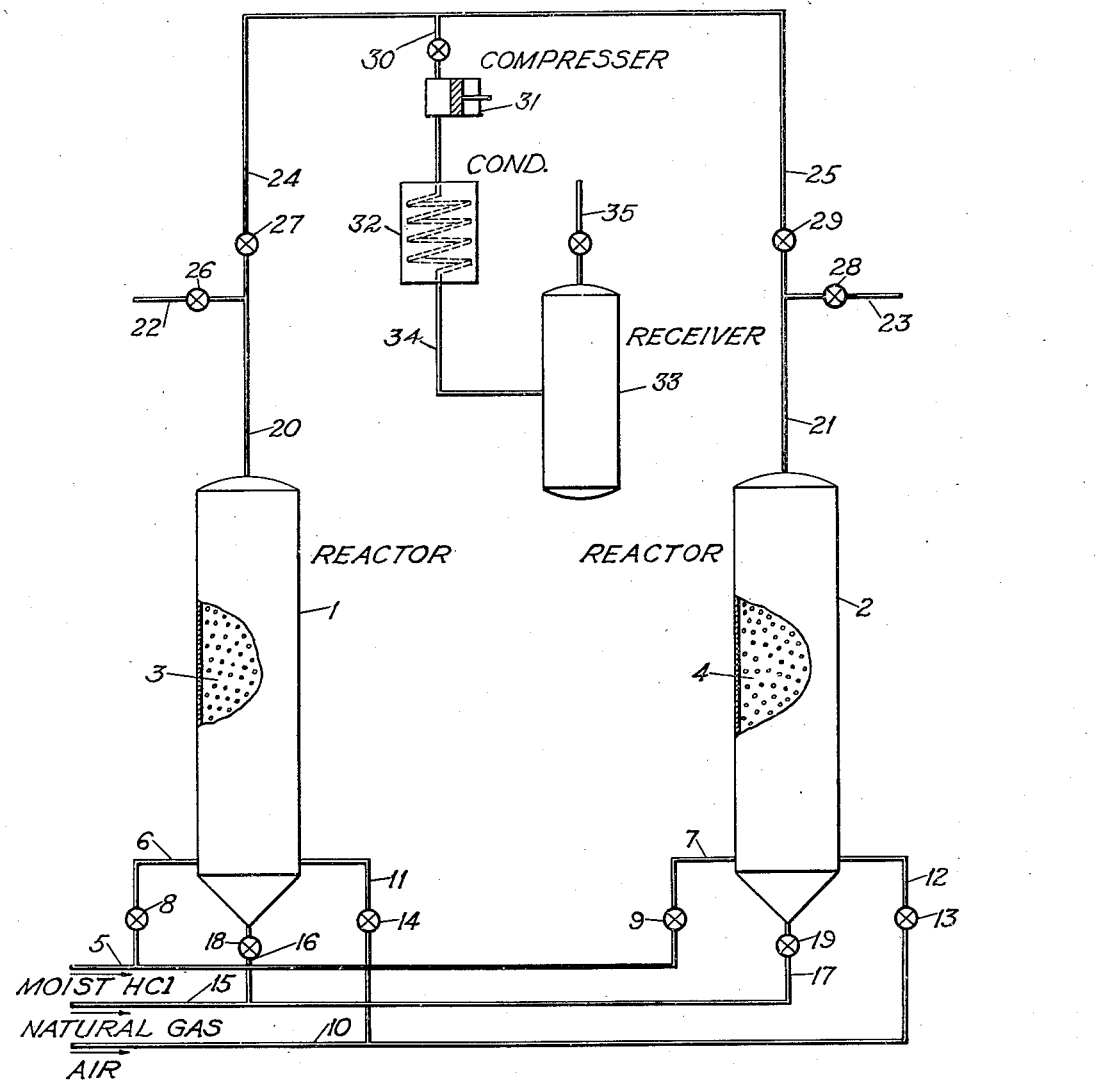

Aug. 14, 1945.   E. GORIN   2,382,788
ANHYDROUS HALOGEN ACIDS
Filed March 19, 1943   2 Sheets-Sheet 1

Everett Gorin
INVENTOR
BY Sidney A. Johnson
ATTORNEY

Patented Aug. 14, 1945

2,382,788

UNITED STATES PATENT OFFICE 2,382,788

ANHYDROUS HALOGEN ACIDS

Everett Gorin, Dallas, Tex., assignor, by mesne assignments, to Socony-Vacuum Oil Company, Incorporated, New York, N. Y., a corporation of New York Application March 19, 1943, Serial No. 479,804

10 Claims. (Cl. 23—152)

This invention relates to the preparation of anhydrous halogen acids, particularly anhydrous hydrochloric and anhydrous hydrobromic acids, from the dilute aqueous acids. The anhydrous halogen acids are required for many purposes, as for example in the production of alkyl halides by the reaction of the halogen acid with olefins and in the production of anhydrous metallic halide catalysts of the Friedel-Crafts type by the reaction of the metal with the halogen acid.

Aqueous halogen acids are obtained as by-products in many of the process industries. Typical instances are the halogenation of hydrocarbons, the pyrolysis of chlorine compounds, and the hydrolysis of organic chlorides or of catalyst tars containing metallic halide catalysts in the form of complexes with organic compounds. These dilute halogen acids are frequently unusable at the points where they are produced, and, because of their highly corrosive nature and their low value at the point of their production, many processes have been suggested for the recovery of the halogen value therefrom or for the production of the anhydrous acid therefrom.

The prior art has generally been concerned with the oxidation of the halogen acid to the free halogen by the so-called "Deacon process." While this process for the recovery of halogen value is fairly satisfactory from an operating standpoint, it has proven extremely difficult to recover the halogen at a cost low enough to compete with the halogen produced by other processes, such as electrolytic chlorine. Temperature control of the catalyst bed and the problem of preventing excessive losses of catalyst due to its loss by volatilization have offered considerable difficulties and have increased the cost of operating this process. Another difficulty has been that the reaction

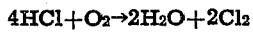

does not go to completion, and the dilute HCl must be removed and concentrated by distillation or by some other process, otherwise the accumulation of water will choke up the system. Also, the system is limited in the amount of water which may be processed along with that produced by the initial oxidation of HCl, some method of first partially dehydrating the acid generally being required.

Up to the present no satisfactory method has been proposed for preparing the anhydrous halogen acid from the aqueous acid. A certain degree of concentration may be effected by distillation. However, this procedure can only concentrate the acid as far as the azeotropic mixture which contains only about 20 percent of the halogen acid in the case of HCl. The use of the ordinary regenerable desiccants is not satisfactory since these absorb considerable quantities of the halogen acid along with the water vapor taken up by the desiccant, leading to a substantial loss of the halogen acid. Anhydrous halogen acids may be produced from the moist acid containing more than 20 percent hydrogen chloride by low temperature fractionation, but this is a difficult and expensive process and only incomplete recovery of the hydrogen chloride content is obtained.

Likewise the usual procedure for manufacturing hydrochloric acid by the reaction of a halogen salt with sulphuric acid does not give an anhydrous acid under the reaction conditions employed. Dehydration of sulphuric acid takes place and the hydrogen chloride evolved is contaminated with water as a result. The usual method of preparing the anhydrous halogen acids resorts to the reaction of hydrogen with the dry halogen.

It is, therefore, an object of my invention to provide an aconomical method of converting the moist halogen acids into anhydrous halogen acids. Other and further objects of my invention will be apparent from the description thereof and from the appended claims.

I have found that the moist halogen acids will react with certain heavy metals at elevated temperature to produce substantially anhydrous metallic halides. The halogen acid may be recovered in an anhydrous form from these metallic halides by reduction of the halide with hydrogen, methane or natural gas. I prefer to use methane or natural gas, which consists predominantly of methane in admixture with other light gaseous hydrocarbons, because of the relative low cost of these gases as compared with hydrogen. It is to be understood, however, that the process works equally well with hydrogen or the light hydrocarbons such as ethane, propane or butane. The reactions are illustrated by the following equations:

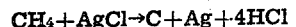
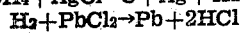

The metals which I have found satisfactory for carrying out my process are copper, silver, mercury and lead. Essentially the process consists in passing the moist halogen acid at a temperature between about 350° and 700° C., depending somewhat upon the particular metal used, in contact with the metal. The moist halogen acid is preferably admixed with air to assist in the oxidation of the metal to the metallic chloride. The metallic halide is then reacted at a temperature between about 400° and about 1000° C. with hydrogen or methane to produce the anhydrous acid and reduce the metallic halide back to the free metal. Here again, the exact temperature used depends to a certain extent upon the particular metal used, and upon the nature of the gaseous reducing agent. Where hydrogen is used as the reducing agent lower temperatures may be employed, whereas in the case of a hydrocarbon gas, temperatures of above 500° C. are required to effect the desired reduction. Where a hydrocarbon gas is used, it is desirable to remove the carbon deposited on or mixed with the metal to prevent a continued accumulation of carbon in the reaction zone. This may be readily done by oxidation of the carbon by the passage of heated air, oxygen or steam through the reaction zone. The carbon will be oxidized to a mixture of carbon monoxide and carbon dioxide and these gases will pass out of the reaction zone. Where air or oxygen is used for this oxidation step a part of the metal will be converted to the oxide by the oxidation, but this does not disadvantageously affect the process since the metallic oxide will be readily converted to the chloride by the reaction of the moist halogen acid.

As mentioned previously, the halogen acids are preferably mixed with air or oxygen to aid in the formation of metallic halide. The amount of air or oxygen added to the halogen acid should preferably not be in large excess over that theoretically required to oxidize to water all of the hydrogen, liberated by the reaction of the halogen acid with the metal. The addition of oxygen makes the reaction proceed more rapidly, possibly because of the removal of one of the products of the reaction. In the presence of oxygen the reaction of the metal with the halogen acid may be expressed as

$$Me + 2HX + \tfrac{1}{2}O_2 \rightarrow MeX_2 + H_2O$$

Where a paraffin hydrocarbon has been used as the reducing agent and a part of the metal has been converted to the oxide during the removal of carbonaceous impurities from the metal by oxidation with air or oxygen, a reduction in the amount of air or oxygen admixed with the halogen acid is advisable to allow for the oxide present.

My invention may be best understood by the following description of the mode of operation thereof and the accompanying drawings. The invention is illustrated as being carried out with the use of a paraffin hydrocarbon as the reducing agent. Obviously, the process of the invention will be simplified where hydrogen is used as the reducing agent to the extent that the step of oxidizing carbonaceous impurities will be unnecessary.

Figure 2:
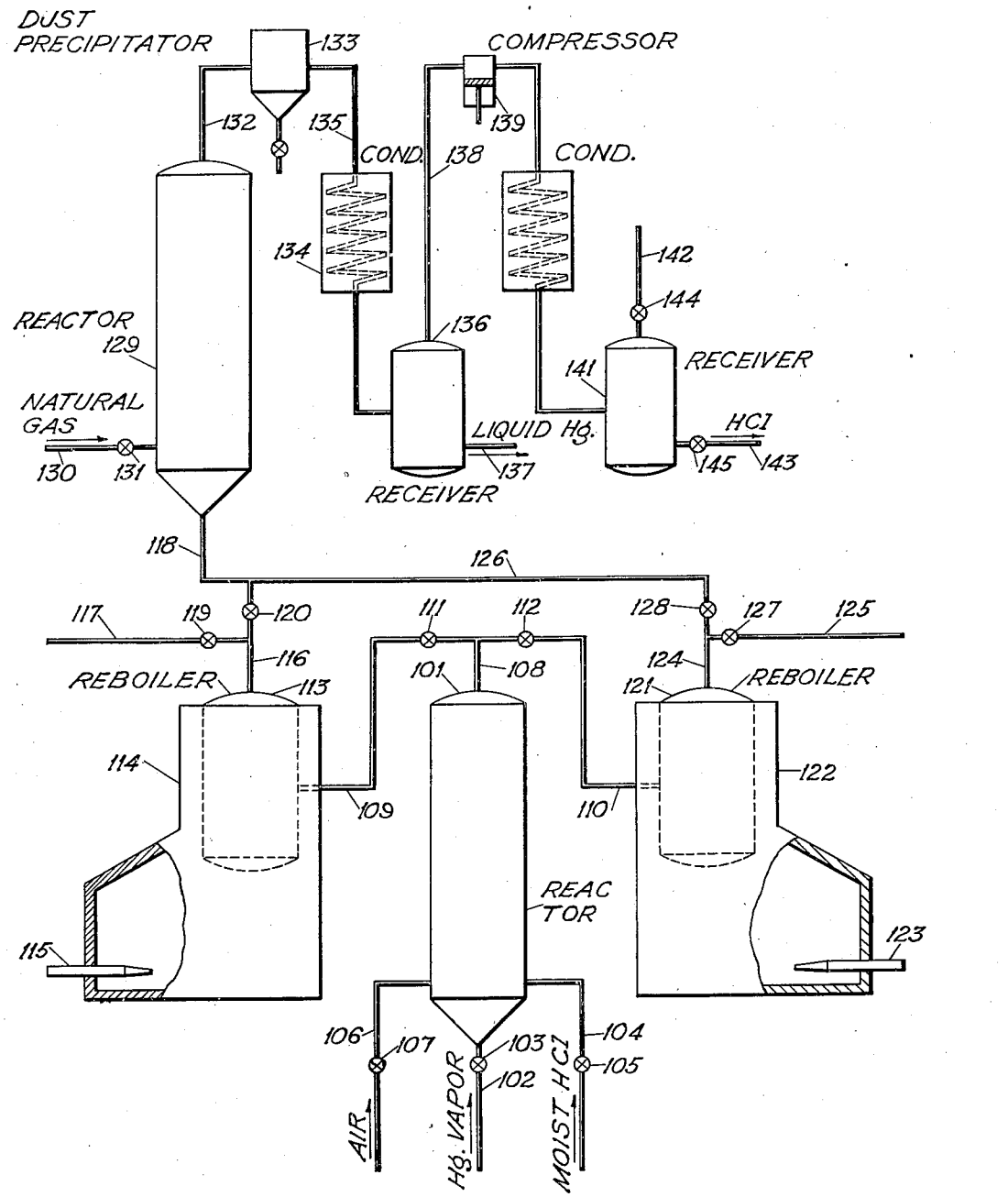

In the drawings, Figure 1 illustrates diagrammatically a form of apparatus suitable for carrying out the process of the invention where the metal is in the liquid or solid state. This form of apparatus is suitable for use where the metal used is copper, silver or lead. Where the metal used is mercury, due to the high volatility of mercuric chloride, the oxychlorination reaction is carried out in the vapor phase by the reaction of mercury vapor with a hydrogen chloride-air mixture and the form of apparatus diagrammatically illustrated in Figure 2 is used.

In Figure 1, I will illustrate my invention as being carried out with metallic silver dispersed on a silica gel contact mass. Since the reaction proceeds in two separate steps, two reactors are used in a cyclic operation to permit continuous processing of the reactants. Reactors 1 and 2 are packed with a silica contact mass impregnated with metallic silver as shown at 3 and 4. Moist hydrochloric acid in line 5 may enter the reactors 1 and 2 alternately through lines 6 and 7, provided with control valves 8 and 9. Air in line 10 may enter the reactors alternately through lines 11 and 12, provided with control valves 13 and 14. Natural gas in line 15 may enter the reactors alternately through lines 16 and 17, provided with control valves 18 and 19. The vapor effluent from the reactors passes off through lines 20 and 21, either through lines 22 or 23, to discharge or through lines 24 or 25 to the anhydrous hydrochloric acid recovery system. Valves 26 and 27 are provided in lines 22 and 24, respectively, to enable control of the direction of flow of vapor effluent from reactor 1. Similarly valves 28 and 29 are provided in lines 23 and 25, respectively, to control the direction of the flow of the vapor effluent from reactor 2. Lines 24 and 25 are connected through a T connection to line 30, leading to compressor 31, wherein the hydrogen chloride gas may be compressed to facilitate its subsequent condensation to a liquid in condenser 32. The liquid HCl then flows to receiver 33 through line 34, wherein it is collected for subsequent use. Receiver 33 is provided with a suitable vent 35.

Assuming normal operating conditions, reactor 1 will be packed with metallic silver on the contact mass. The metallic silver will be contaminated with carbonaceous deposit. Reactor 2 will contain silver chloride deposited on the contact mass. Valves 18, 9, 13, 28, and 27 will be closed. Valves 8, 14, 19, 29, and 26 will be open. Moist hydrochloric acid and air will enter reactor 1 through lines 6 and 11, wherein they will react with the metallic silver and carbon to form silver chloride, water, and carbon oxides. The water vapor and carbon oxides liberated by this reaction will pass out of the system through lines 20 and 22. Natural gas will enter reactor 2 through line 17 and react with the silver chloride therein to form anhydrous hydrogen chloride, metallic silver and carbon. The anhydrous hydrogen chloride gas will pass overhead through lines 21, 25, and 30, to compressor 31 and condenser 32. Liquid anhydrous hydrochloric acid will be collected in receiver 33. When the major portion of the silver chloride in reactor 2 has been reduced to metallic silver valves 19 and 29 will be closed, shutting off the flow of natural gas to the reactor and the flow of gases to the anhydrous hydrochloric acid recovery system. Valves 9, 13, and 28 will be opened and moist hydrochloric acid and air sent through the system to form silver chloride and remove the carbonaceous residue. When the flow of natural gas to reactor 2 is cut off, the cycle of operation of the reactor 1 is simultaneously reversed by closing valves 8, 14, and 26 and opening valves 18 and 27. The natural gas will then enter reactor 1 through line 16 and react with the silver chloride formed therein in the previous cycle. When the major portion of silver chloride in reactor 1 has been reduced to metallic silver the cycle will be again repeated. In order to facilitate the removal of carbon from the contact mass it may be preferable to open valve 14 before moist hydrochloric acid is let into the reactor through line 6. The air will burn out the carbon, and so long as the temperature of the reactor is maintained above 200° C. there will be no formation of silver oxide which is unstable at temperatures above this value. Another method of operating would be to have a high ratio of air to moist hydrochloric acid during the early part of the silver chloride regeneration cycle to remove the carbon.

Inasmuch as mercuric chloride is volatile at the temperature of the oxychlorination reaction, I prefer to carry out the reactions where mercury is the metallic agent used, in the vapor phase. In Figure 2 there is diagrammatically illustrated an apparatus suitable for carrying out my process in the vapor phase with mercury. Mercury vapor, heated to above 350° C., is passed into reactor 101 through line 102, provided with control valve 103. In the reactor, the mercury vapor reacts with moist hydrochloric acid introduced through line 104, provided with control valve 105 in the presence of air introduced through line 106, provided with control valve 107. The effluent from the reactor passes through line 108, either to line 109 or 110 through a T connection. Valves 111 and 112 are provided in lines 109 and 110, respectively, to control the direction of flow of the reactor effluent. Line 109 is connected to the reboiler 113, which is interiorly provided with baffles (not shown) for a purpose to be described later. Reboiler 113 is placed in a suitable furnace 114 heated with burners 115. The effluent from the reboiler passes out through line 116 to either line 117 or 118, which are provided with control valves 119 and 120, respectively, to control the direction of flow of the effluent from the reboiler 113. Line 110 is connected to a similar reboiler 121 in furnace 122, provided with burners 123. The effluent from this reboiler may flow through line 124, either through line 125 or through line 126 to line 118. Valves 127 and 128 are provided in lines 125 and 126, respectively, to control the direction of flow of the effluent from reboiler 121. The reboilers serve alternately as a condenser for mercuric chloride, and then as a revaporizer in the manner to be described later, and furnish a continuous supply of mercuric chloride vapor to line 118. Mercuric chloride vapor in line 118 enters reactor 129, wherein it reacts with natural gas entering through line 130, provided with a suitable control valve 131. The velocity of flow of the natural gas is adjusted to entirely reduce the mercuric chloride to metallic mercury, and the hydrocarbon constituents in the natural gas react with the mercuric chloride to form anhydrous hydrogen chloride and carbon. The effluent from this reactor passes through line 132 to a suitable dust precipitator 133, wherein the carbon is removed from the gas stream. The purified gas mixture will then pass to condenser 134 through line 135, wherein the mercury vapor in the mixture will be condensed. In receiver 136 liquid mercury will separate from gaseous hydrogen chloride and be drawn off through line 137 for revaporization and reuse in the process. The HCl vapor will pass overhead from receiver 136 through line 138 to compressor 139, wherein its pressure will be raised. The compressed gas will pass to condenser 140, wherein the hydrogen chloride will be condensed to a liquid and sent to receiver 141. The receiver will be provided with a suitable vent 142 and a liquid takeoff line 143 for the removal of the liquid hydrogen chloride product. Valves 144 and 145 will be provided in lines 142 and 143, respectively, to enable the maintainance of this portion of the system under pressure.

Where copper or lead are the metals used, the reaction between the metallic halide and the methane or natural gas may be carried out by bubbling the natural gas or methane through the molten salt. In order for the reaction between cuprous chloride and methane to proceed readily, temperatures above 600° C. should be used. At these temperatures the cuprous chloride is molten. Likewise, in the case of lead, any reaction between lead chloride and methane requires temperatures in excess of 800° C., at which point the lead chloride is molten. On the other hand, temperatures below 650° C. should be used for the formation of the halides of these two metals by the oxyhalogenation reaction to avoid hydrolysis of the halides.

In the case of copper a reactor, charged with the metal in the form of chips or powder could be used, and hot moist hydrochloric acid and air blown into the reactor. The reaction is exothermic, and so long as the reactants are at a sufficiently high temperature to initiate the reaction, no heat will be required. After the metallic chloride has been formed, the temperature of the salt must be raised somewhat to attain the preferred temperature for the reduction with methane. When this has been done, methane will then be passed through the molten salt. In the event that hydrogen is used as the gaseous reducing agent, it is unnecessary to raise the temperature of the molten salt, since this material is a sufficiently active reducing agent to react with cuprous chloride at temperatures below 650° C. Means should be provided to separate copper powder formed from the hydrogen chloride gas product.

In the case of lead, the reaction will be between molten lead and the hot moist hydrochloric acid and air, since lead has a low melting point. Here, as in the case of silver, a packed reactor would be used with the molten lead flowed downwardly over the packing countercurrent to an ascending stream of moist hydrochloric acid gas and air. The molten lead chloride formed may then be transferred to a second reactor wherein it would be flowed downwardly over packing countercurrent to a stream of ascending natural gas. In the second reactor the lead chloride would be reduced to metallic lead contaminated with carbonaceous residue. Since this reaction is effected at temperatures of above about 800° C., at which temperatures the lead chloride has appreciable volatility, suitable precautions should be taken to prevent the vaporization of the lead chloride along with the anhydrous hydrochloric acid. The lead chloride may be introduced some distance below the top of the reactor and some excess methane used, so that any lead chloride vapor would be reduced to metallic lead. A condenser at the top of the reactor might also be used. The contaminated lead would then be returned to the first reactor, wherein the carbon would be oxidized, or the lead might be purified in any suitable manner before recycling to the first reactor. An apparatus suitable for circulating the lead-lead halide melt from one reactor to another is diagrammatically illustrated in my copending application, Serial No. 479,803, filed March 19, 1943.

The following examples illustrate the preferred mode of operation of my invention. The invention should not be construed, however, as limited to the mode of operation described in the examples.

*Example 1*

A silver oxide-silica contact mass was prepared in the following manner. 112 grams of silver nitrate were dissolved in 2250 cc. of water. A solution of 150 cc. of Philadelphia Quartz Company grade E sodium silicate, containing 29 percent silicon dioxide and 9 percent sodium oxide, was diluted with 150 cc. of water and this solution added to the silver nitrate solution with constant stirring. The mixed solutions were allowed to stand for several days during which time a yellow hydrogel was formed. This hydrogel was then washed with water and dried at 110° C. The contact mass then calcined in a current of nitrogen at 600° C. before using in the acid dehydration process to decompose the silver oxide. The final catalyst contained 52 percent by weight of metallic silver.

A moist hydrochloric acid air mixture containing 9.5 percent of hydrogen chloride was passed over the contact mass at a temperature of 525° C. and at a space velocity of 1.2 volumes of gas per unit volume of catalyst per minute, measured at standard conditions of temperature and pressure. The hydrogen chloride was quantitatively absorbed by the silver to form anhydrous silver chloride. The contact mass impregnated with the anhydrous silver chloride was reduced by passing a stream of hydrogen thereover at a temperature of 540° C. and at a space velocity of 2.5 volumes of hydrogen per unit volume of catalyst per minute, measured at standard conditions of temperature and pressure. Over 99 percent of the hydrogen chloride of the original moist hydrochloric acid-air mixture charged was recovered as anhydrous hydrogen chloride.

Example 2

A hydrogen chloride-air mixture containing 25.8 percent of hydrogen chloride was passed over a silver oxide-silica contact mass, prepared as described in Example 1, at 735° C. and at a space velocity of 5. All of the hydrogen chloride was absorbed by the silver as silver chloride even though 70 percent of the silver in the contact mass was chlorinated. The silver chloride impregnated contact mass was then reduced by passing propane thereover at a temperature of 740° C. and at a space velocity of 10. Over 99 percent of the hydrochloric acid was recovered as anhydrous hydrogen chloride.

Example 3

A moist hydrochloric acid-air mixture containing 27.2 percent of hydrogen chloride was passed over a silver oxide-silica contact mass, prepared as described in Example 1, at a space velocity of 12.5 and at a temperature of 830° C. In this case, although 85 percent of the silver was converted to silver chloride, all of the hydrogen chloride in the charge gas was absorbed and converted to silver chloride. The silver chloride impregnated contact mass was then reduced by passing methane thereover at a temperature of 780° C. and at a space velocity of 7. All of the silver chloride was reduced to anhydrous chloride and over 99 percent of the hydrogen chloride in the original gas mixture was recovered. An equivalent amount of methane was converted to carbon which was deposited in the contact mass.

Example 4

A moist hydrochloric acid-air mixture containing 27.2 percent of hydrogen chloride was bubbled up through molten lead at a temperature of 530° C. and at a rate of 18.5 liters per hour. All of the hydrogen chloride in the charge gas was converted to lead chloride. The mixture of lead and lead chloride was then heated to 925° C. and methane bubbled therethrough at a rate of 21 liters per hour. The lead chloride was all reduced to metallic lead by the methane, and presumably initially all converted to anhydrous hydrogen chloride. A considerable part of the methane, however, was converted to higher hydrocarbons, principally benzene, ethylene and acetylene.

Example 5

The procedure of Example 4 was repeated except that the temperature of the lead-lead chloride mixture formed in the first step was 875° C., and the methane was bubbled therethrough at a rate of 9 liters per hour. As in Example 4, the lead chloride was all reduced to metallic lead and anhydrous hydrogen chloride by the action of the methane. At the lower space velocity, the methane was almost completely converted to carbon except towards the very end of the run when the lead chloride had been nearly completely removed from the reactor. 80 percent of the hydrogen chloride in the charge gas was recovered as anhydrous hydrogen chloride.

Complete or substantially complete recovery of the HCl in the moist acid could be obtained with the metallic lead-lead chloride system by using a low space velocity and by regenerating the lead chloride before complete reduction thereof to metallic lead were obtained.

An advantage of my process is the ease with which the conversion of methane to hydrogen chloride may be made nearly quantitative by proper adjustment of the space velocity of the methane over the metallic halide. If the product gas contains appreciable quantities of methane, the space velocity may be lowered until the quantity of methane in the product gases becomes zero or negligible. In actual operation on a continuous scale, the process may be carried out in either of two ways. Since near the end of the metallic halide reduction cycle, the completeness of the conversion of methane to anhydrous hydrochloric acid would drop rapidly unless the space velocity of the methane were progressively reduced to zero, the process may be stopped before the metallic halide has been completely reduced, and the halide regenerated by treating the free metal with the moist halogen acid. Or, if desired, the methane or other reducing gas may be passed through the reaction zone at a constant rate. When the metallic halide has been nearly completely reduced and the product gases are a mixture of anhydrous hydrogen chloride and gaseous hydrocarbons, the product gases may then be taken off for recycling through a freshly charged reactor.

In the case of mercuric chloride, where the reaction is carried out in the vapor state, a quantitative conversion of the mercuric chloride and hydrocarbon to metallic mercury and hydrogen chloride may be obtained by proper adjustment of the mole ratio of the two charge gases and the contact time.

The use of silver for the dehydration of moist halogen acids is preferred because the reactions of oxychlorination of the silver to silver chloride, and of reduction of the silver chloride to free metal and anhydrous acid, may be carried out in the same temperature range. Since the heat liberated in the oxychlorination reaction is considerably greater than that consumed by the endothermic reduction of the silver chloride, and since the two reactions may be carried out over the same wide temperature range, the heat liberated by the oxychlorination reaction may be utilized to make the reaction thermally self-sufficient. The exothermic reaction will heat the contact mass to a higher temerature within the operating range to compensate for heat losses due to radiation, etc., from the reaction vessel and to furnish heat for the endothermic reaction. Some heat is also furnished to the contact mass, where a hydrocarbon is used as the reducing agent, in the subsequent oxidation of the carbonaceous deposit. This compensates for the somewhat greater amount of heat required where the reducing agent is a hydrocarbon gas. Exact temperature balance may be maintained by adjusting the amount of heat carried from the reaction zone in the effluent gases, as compared to the amount brought into the reaction zone in the charge gases. While some preheating of the charge gases is necessary, I have found that in a well designed and insulated reactor, the charge gases do not need to be preheated to a temperature as high as the operating temperature, and the exhaust gases may be utilized to supply the major portion of or all of the necessary preheating of the charge gases.

In the oxychlorination of silver temperatures much above 800° C. should be avoided, since the chloride of silver has appreciable volatility at temperatures above this value. Preferably the oxychlorination of silver and the subsequent reduction of silver chloride are carried out within the range of from 500° C. to about 800° C.

In the case of mercuric chloride temperatures above 600° C. are necessary to obtain efficient reduction where the gaseous hydrocarbons are used as the reducing agent. While the reaction between mercury and the moist halogen acid could be carried out at this temperature, from an operating standpoint temperatures as low as possible, compatible with the obtaining of reaction, are much preferred. Therefore, temperatures in the neighborhood of 350° C. to 400° C. are preferably used for the reaction of mercury with the moist halogen acid, and the thermal balance of the reaction, particularly in view of the requirement for condensation and revaporization of both mercury and mercuric chloride, is not as attractive as in the case of silver.

In the case of copper, unless hydrogen is used as the gaseous reducing agent, different temperatures are required for the oxychlorination reaction and for the hydrocarbon reaction. This involves the reheating and cooling of the contact mass in passing from one stage of the process to the other. A similar situation exists where lead is the metallic agent used, in an even more aggravated case, since temperatures above 800° C. are required for the reduction of lead chloride with hydrocarbon gases.

The foregoing remarks with respect to the chlorides of silver, mercury, copper and lead are equally applicable to the dehydration of hydrobromic acid via the formation of silver bromide, mercuric bromide, cuprous bromide and lead bromide. The principal difference in the case of these two acids is that the metallic bromides and iodides are not as readily reduced by hydrogen or the gaseous hydrocarbons, and the product gases would be a mixture of the reducing gas and the anhydrous acid. The reducing gases would have to be separated from the dry halogen acid and recycled to the reaction zone.

Anhydrous hydrogen fluoride could also be formed from aqueous hydrofluoric acid by my process. Where silver on an inert support is used, obviously silica gel would not be suitable as the support since it would react with the hydrofluoric acid. Other metallic oxide gels, such as a chromic oxide gel, of high surface area and low reactivity towards the hydrogen fluoride could be substituted for the silica gel. While such oxides are not absolutely inert towards the hydrofluoric acid, stable complexes would form which would resist continued reaction. Moreover, silver itself, prepared in a porous form, as by the thermal decomposition of silver compounds precipitated from aqueous solutions, may be used as its own support. In this case, the oxyfluorination reaction should not be carried to completion. Sufficient unreacted silver should remain to retain the molten silver fluoride. The use of my invention for dehydrating hydrofluoric acid is of increasing importance due to the increasing use of this acid as a catalyst for hydrocarbon reactions, particularly the alkylation of light isoparaffins with olefins. Due to the presence of small amounts of water in the hydrocarbons, dilution of the acid occurs. While the substantial bulk of the hydrogen fluoride may be recovered in an anhydrous condition by fractional distillation, an azeotrope is left in the column from which the anhydrous acid must be separated by some other method. Also certain processes can utilize concentrated aqueous acid as the catalyst. The concentration of this recycled catalyst, however, must be adjusted continuously by the addition of the proper amount of anhydrous acid and water to the recycled catalyst, since in distilling the catalyst from the organic impurities, anhydrous acid is taken off overhead for recycling and a large amount of aqueous acid is left with the impurities. This aqueous acid must be treated for the recovery of the hydrogen fluoride content by some method other than distillation.

Many modifications of my invention and of the preferred modes of operation thereof illustrated herein will be apparent to those skilled in the art and the invention should not be construed as limited except as indicated in the appended claims.

I claim:

1. In a process for the production of substantially anhydrous hydrogen chloride from moist hydrochloric acid the steps of (1) flowing the moist hydrochloric acid in the vapor state in admixture with an oxygen containing gas at a temperature between 500° C. and 800° C. through a reaction zone in contact with metallic silver supported on a contact mass to form the corresponding silver halide in the reaction zone, (2) removing water vapor from the reaction zone, (3) passing natural gas through the reaction zone in contact with the silver halide supported on the contact mass formed in step 1 at a temperature between 500° C. and 800° C. to form substantially anhydrous hydrogen chloride, (4) removing the hydrogen chloride from the reaction zone, (5) utilizing the contact mass having the reduced silver from step 3 deposited thereon as the metallic silver supported on a contact mass in step 1, and (6) recovering the hydrogen chloride from step 4.

2. In a process for the production of substantially anhydrous hydrogen chloride from moist hydrochloric acid the steps of (1) flowing the moist hydrochloric acid in the vapor state in admixture with an oxygen containing gas at a temperature between 500° C. and 800° C. through a reaction zone in contact with metallic silver supported on a contact mass to form the corresponding silver halide in the reaction zone, (2) removing water vapor from the reaction zone, (3) passing natural gas through the reaction zone in contact with the silver halide supported on the contact mass formed in step 1 at a temperature between 500° C. and 800° C. to form substantially anhydrous hydrogen chloride, (4) removing the hydrogen chloride from the reaction zone, (5) passing a hot, oxidizing gas selected from the group consisting of air, oxygen or steam through the zone to oxidize carbon deposited on the contact mass in the reaction zone, (6) utilizing the thus purified contact mass having the reduced silver from step 3 deposited thereon as the metallic silver supported on a contact mass in step 1, and (7) recovering the hydrogen chloride from step 4.

3. In a process for the production of substantially anhydrous hydrogen halides from moist halogen acids the steps of (1) flowing the moist halogen acid in the vapor state at a temperature above 350° C. in contact with a metal from the group consisting of silver, copper, lead and mercury to form the corresponding metallic halide, (2) removing the water vapor from the metallic halide, (3) passing a gaseous reducing agent selected from the group consisting of hydrogen and the normally gaseous hydrocarbons into contact with the metallic halides formed in step 1 at a temperature above 400° C. to form substantially anhydrous hydrogen halide, (4) separating the hydrogen halide from the metallic halide reduction product containing the reduced free metal, (5) utilizing at least a substantial portion of the metallic halide reduction product containing free metal from step 4 as the metal in step 1, and (6) recovering the hydrogen halide from step 4.

4. In a process for the production of substantially anhydrous hydrogen halides from moist halogen acids the steps of (1) flowing a mixture of an oxygen containing gas and the moist halogen acid in the vapor state at a temperature above 350° C. in contact with a metal from the group consisting of silver, copper, lead and mercury to form the corresponding metallic halide, (2) removing the water vapor from the metallic halide, (3) passing a gaseous reducing agent selected from the group consisting of hydrogen and the normally gaseous hydrocarbons into contact with the metallic halides formed in step 1 at a temperature above 400° C. to form substantially anhydrous hydrogen halide, (4) separating the hydrogen halide from the metallic halide reduction product containing the reduced free metal, (5) utilizing at least a substantial portion of the metallic halide reduction product containing free metal from step 4 as the metal in step 1, and (6) recovering the hydrogen halide from step 4.

5. In a process for the production of substantially anhydrous hydrogn chloride from moist hydrochloric acid the steps of (1) flowing the moist hydrochloric acid in the vapor state in admixture with an oxygen containing gas at a temperature between 350° C. and 650° C. through a reaction zone in contact with metallic copper to form the corresponding cuprous halide in the reaction zone, (2) removing water vapor from the reaction zone, (3) passing a gaseous reducing agent selected from the group consisting of hydrogen and the normally gaseous hydrocarbons into contact with the cuprous halide formed in step 1 at a temperature above 400° C. to form substantially anhydrous hydrogen halide, (4) separating the hydrogen halide from the cuprous chloride reduction product containing the reduced free copper, (5) utilizing at least a substantial portion of the free copper from step 4 as the copper in step 1, and (6) recovering the hydrogen halide from step 4.

6. In a process for the production of substantially anhydrous hydrogen halide from moist halogen acids the steps of (1) flowing the moist halogen acid in the vapor state in admixture with an oxygen containing gas at a temperature between 500° C. and 800° C. through a reaction zone in contact with metallic silver to form the corresponding silver halide in the reaction zone, (2) removing water vapor from the reaction zone, (3) passing a gaseous reducing agent selected from the group consisting of hydrogen and the normally gaseous hydrocarbons into contact with the silver halide formed in step 1 at a temperature between 500° C. and 800° C. to form substantialy anhydrous hydrogen halide, (4) separating the hydrogen halide from the silver halide reduction product containing the reduced free silver, (5) utilizing at least a substantial portion of the free silver from step 4 as the silver in step 1, and (6) recovering the hydrogen halide from step 4.

7. The process of claim 4 wherein the gaseous reducing agent is natural gas.

8. The process of claim 4 in which the moist halogen acid is moist hydrochloric acid.

9. The process of claim 4 in which the moist halogen acid is moist hydrobromic acid.

10. The process of claim 6 wherein the moist halogen acid is moist hydrofluoric acid.

EVERETT GORIN.